United States Patent Office

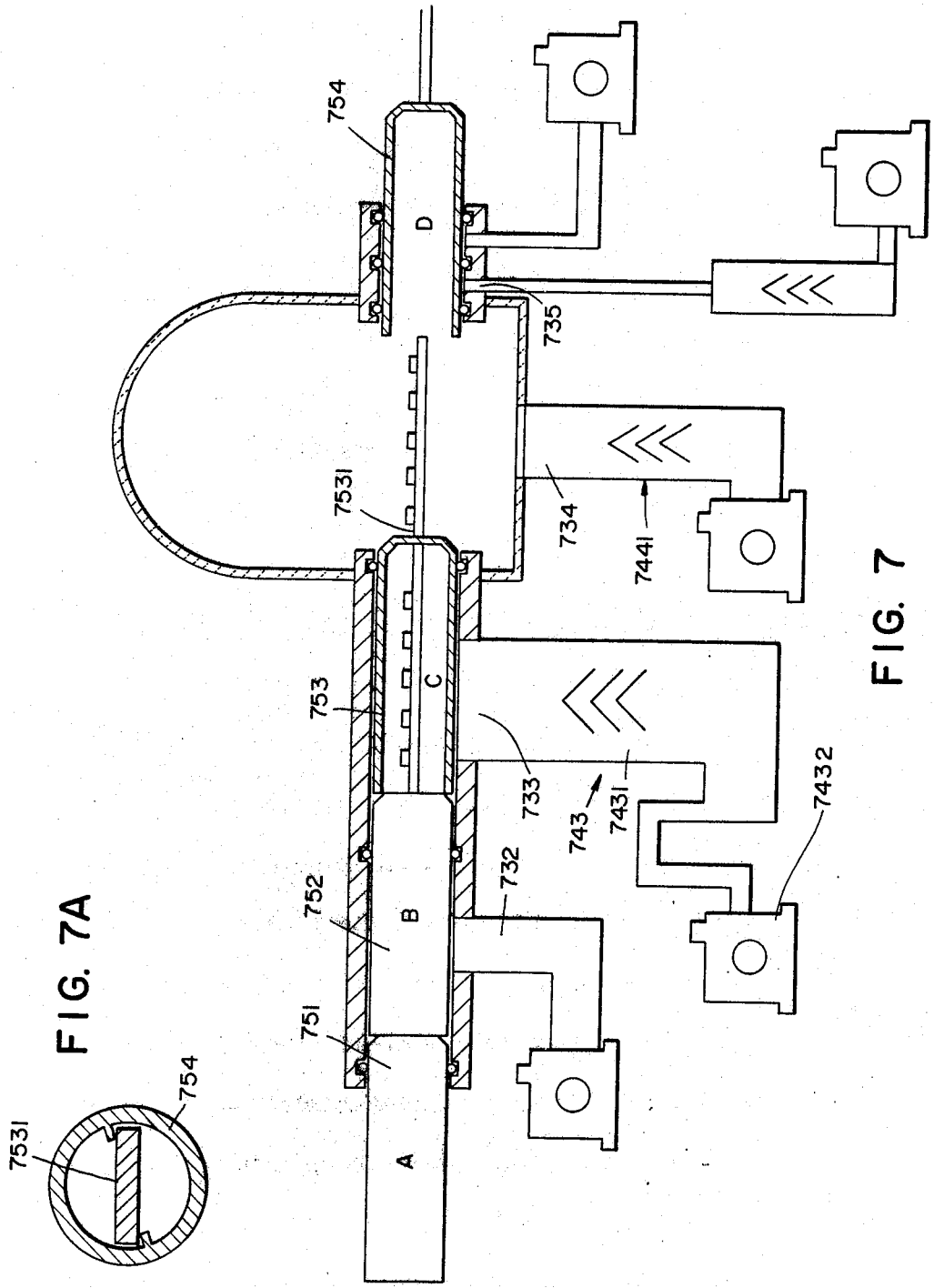

3,486,365
Patented Dec. 30, 1969

3,486,365
LEAK DETECTOR AND VACUUM PUMPING STATION FOR HIGH PRODUCTION RATES
Walton E. Briggs, Lynnfield, Mass., assignor to National Research Corporation, Newton Highlands, Mass., a corporation of Massachusetts
Filed Nov. 16, 1967, Ser. No. 683,601
Int. Cl. G01m 3/04
U.S. Cl. 73—40.7                   20 Claims

ABSTRACT OF THE DISCLOSURE

Leak detector and vacuum pumping station for conducting leak tests of several thousand parts per hour with a single leak test instrument. The leak test instrument is held at its requisite operating vacuum and the vacuum pumping station presents parts to the leak detector after reducing the environment of the parts from atmospheric pressure to said vacuum level. The vacuum pumping station comprises a tunnel and a train of containers, each carrying a test part, passing through the tunnel. The pumping station also has utility in other apparatus, such as vacuum furnaces or vacuum coaters, where parts to be treated are moved from ambient into a vacuum zone.

---

This invention relates to a leak detector apparatus combination and a vacuum pumping station subcombination therefor, the latter also having utility in other contexts.

BACKGROUND

Leak detection instruments are used in manufacuring industries for a wide variety of testing purposes including leak testing of a wide variety of small parts such as sealed transistors or microcircuits. Most of the instruments in the field are what may be termed discontinuous instruments, involving handling of parts, one at a time or a few at a time per pumping cycle. The limiting problem involved in the instrument is the necessity to reduce the environment of the part to be tested to high vacuum.

Generally, the parts to be tested are pre-bombed (impregnated) with a trace gas (e.g. helium). The part is then surrounded with a chamber which is sealed and then evacuated by a vacuum pump. Once the pressure in the environment of the part is reduced, a valve is opened to expose the environment of the part of the leak detector's gas analysis sensor. The sensor is a mass sensitive component (e.g. mass spectrometer) tuned to the trace gas. In order to provide and hold the requisite vacuum level for operation of the sensor, a separate vacuum pump evacuates the sensor and operates on it essentially continuously.

If there are any significant leaks in the test part, trace gas emerges from the part and a portion of the trace gas reaches the sensor which detects it.

After the leak test the valve is reclosed for allowing the environment of the part to be released to atmospheric pressure for unloading the part and loading a new part.

Prior art leak detection apparatus and their associated vacuum pumping stations are described in more detail, for example, in U.S. Patents 2,486,199; 2,504,530; 2,550,498; 2,855,777; 2,884,591; 2,897,437; 3,026,715; 3,031,884; 3,126,734; 3,327,521 and in my copending application 544,312 filed Apr. 21, 1966. A vacuum pump station associated with a mass spectrometer is also shown in Canadian Patent 663,254.

OBJECTS

It is the object of the present invention to provide an air to vacuum to air continuous leak detector apparatus affording leak test production rates on the order of several thousand parts per hour.

It is a further object of the invention to provide an improved vacuum pumping station.

GENERAL DESCRIPTION

The present invention utilizes in its vacuum pumping station an elongated passage separated into an axial series of compartments by gaskets. A part to be leak tested is held in each container. Pumping passages are associated with each container. Each compartment is separately evacuated. As each container passes from one compartment to the next, the container is evacuated to lower pressures until it reaches a compartment connected to the gas analysis sensor and at the requisite vacuum level. Then, succeeding compartments are at higher pressures between vacuum and atmospheric pressure. Finally the container emerges from the tunnel for unloading of the tested part and loading of a new part to be tested.

If the gas analysis sensor detects a leak in the part tested, it provides a reject signal. If the leak is a gross leak the sensor can provide an immediate signal to indicate this condition so that the container with the gross leak can be moved quickly out of the leak test compartment ahead of the normal cyclic interval. In this way over-loading of the gas analysis sensor and its pumping system with gas input is prevented and a regular cyclic operation can be maintained. The cyclic motion of the train of compartments through the tunnel can be continuous and essentially smooth (with occasional brief accelerations in case of gross leaks) or it can be step pulsed (with an occasional extra step or partial step motion in case of a gross leak).

The pumping system of the gas analysis sensor is provided with excess capacity for use when initially coupling to each new compartment. Once the gas analysis instrument determines that the gas load from the new compartment is not excessive (e.g. no significant leak in the test part), this excess pumping capacity can be throttled back to eliminate any decrease in sensitivity of leak detection caused by the excess capacity. This control is similar in regard to its automatic operation to that described in my prior U.S. Patent 3,327,521.

In its use or other contexts, the vacuum pumping station is suited to such diverse applications as brazing furnaces, coaters and other applications where high rate treatment of discrete parts at sub-atmospheric pressure is desired.

Other objects, features and advantages, including equivalent variations and other uses, of the invention will in part be obvious and will in part appear herein.

The invention is now specifically described with respect to several embodiments and with reference to the accompanying drawings wherein:

FIGS. 5, 6 and 7 are schematic diagrams of furnaces or coaters utilizing other embodiments of the vacuum pumping station with FIGS. 6A and 7A showing a different form of compartments.

Figure 1:
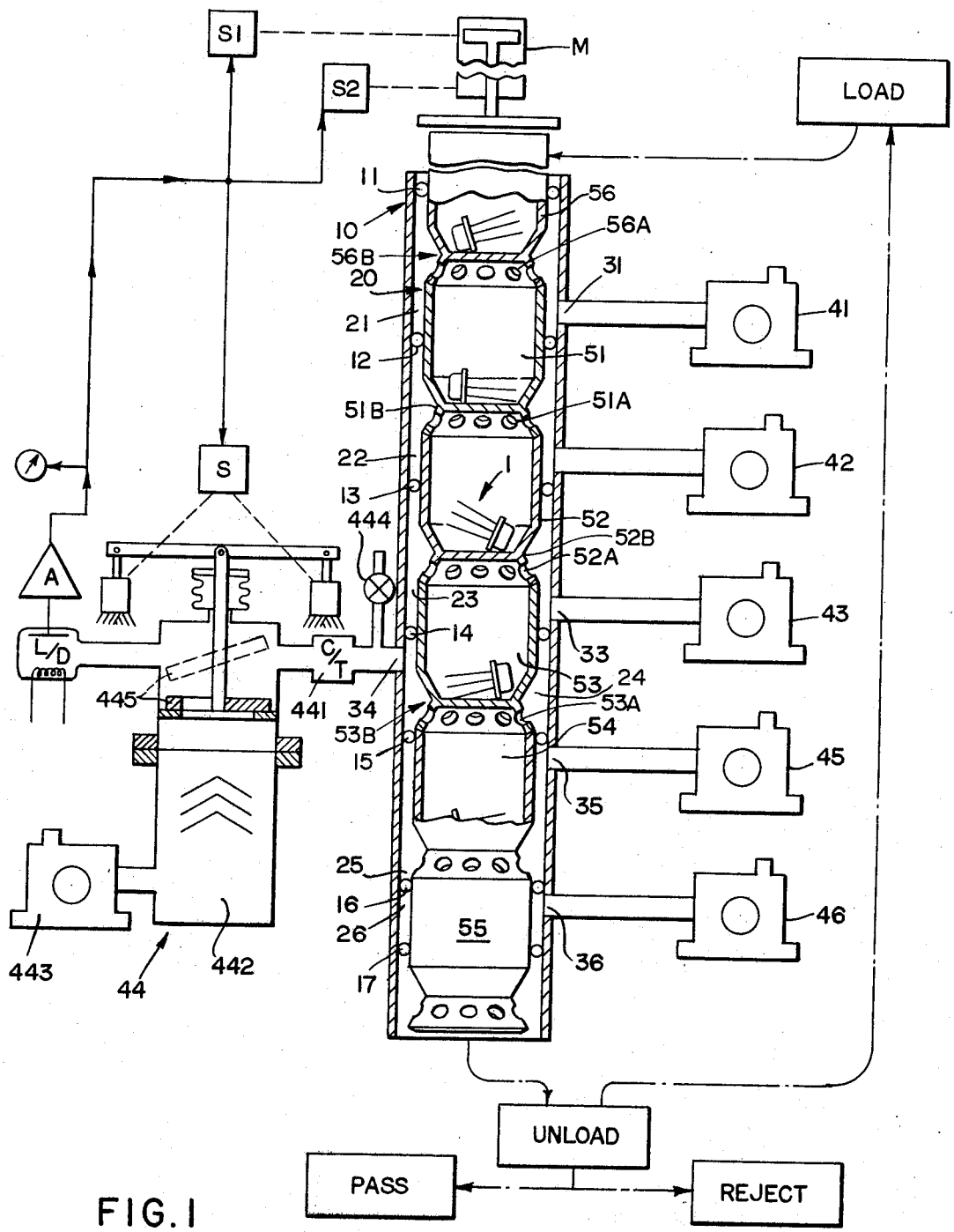
FIG. 1 is a schematic diagram of a leak detector incorporating the basic pressure differential apparatus (vacuum pumping station) of the invention in a preferred and distinctly advantageous embodiment thereof, this usage thereof as a leak detector combination also being a preferred and distinctly advantageous application thereof.

Referring to FIG. 1 the apparatus of the invention comprises a leak detector L/D and a vacuum pumping station.

The vacuum pumping station comprises a cylinder 10 forming an elongated internal tunnel passage 20. Along the axial length of the tunnel 20 there is a series of O-ring gaskets 11, 12, 13, 14, 15, 16, 17 subdividing the tunnel passage into an axial series of compartments 21, 22, 23, 24, 25, 26. A pumping port is formed in each compartment, the ports being indicated at 31, 32, 33, 34, 35, 36 and the pumps or pumping systems associated with these ports being indicated at 41, 42, 43, 44, 45, 46, respectively. An axial series of containers—cannisters 51, 52, 53, 54, 55, 56 is shown passing through the tunnel. Each cannister forms a separate chamber for the production of a pressure environment for treatment of a part contained within the cannister. Associated with each cannister is a pumping passage. In the species shown in FIG. 1, the pumping passage for cannister 51 is a series of ports 56A in the bottom of cannister 56. The pumping passage for cannister 52 is ports 51A in the bottom of cannister 51. Similarly ports 52A, 53A, 54A, provide the pumping passages for cannisters 53, 54, 55, respectively. Each cannister is recessed in the vicinity of the ports, e.g. as indicated at 51B, to avoid extrusion or snagging of the O-ring gaskets by the ports.

The cannisters are sized so that they compress the gaskets, except for the limited axial area of the relief around the ports. Thus the sealing of one compartment from the other is essentially completed. The cannisters are identical and interchangeable. When stacked they are driven at one end by a moving means such as servomotor M shown in FIG. 1. The axial length of each cannister occupied by the parts and relief is held to a very limited portion of the cannister length—less than one-fourth and preferably less than one-eighth. The cannister lengths and compartment lengths (the latter determined by axial spacing of gaskets in the tunnel 20) is selected so that no two axial adjacent gaskets are passed by the relieved section of cannisters at the same time. These lengths are also selected to give each pumping passage (i.e. ports 51A) a sole residence time in each compartment. Generally, it is preferable in most applications to select the cannister and compartment lengths so that no two sets of pumping passages are within the same compartment at the same time. This is accomplished in the FIG. 1 species by making the cannister length different from (and preferably greater than) the axial spacing between any two adjacent gaskets.

FIG. 2—CANNISTER DESIGN

Figure 2:
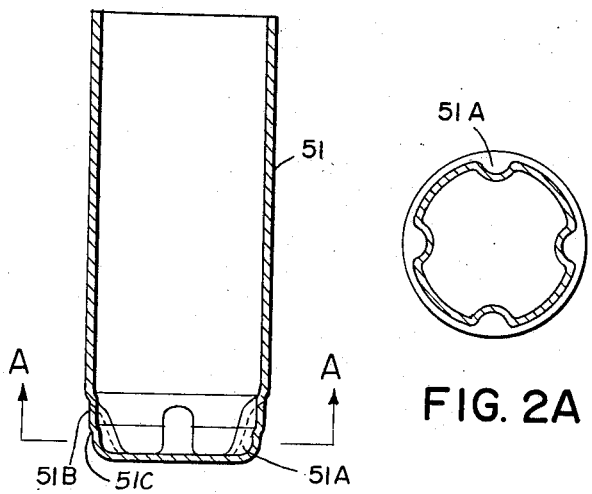
FIG. 2 is a detail drawing of a preferred form of compartment for use in the FIG. 1 apparatus with FIG. 2A being a cross-section taken along the line A—A in FIG. 2 and FIG. 2B being a sketch illustrating coupling of adjacent compartments.

A preferred form of design for the cannisters is shown in FIG. 2 using cannister 51 as an example. The cannister comprises a metal stamping of cup form, the base of the cup having four troughs 51A to form pumping passages for the next adjacent container and an annular relief 51B to prevent gaskets from snagging or extending in the passages. The cannister base has a further relief 51C for nesting with the next adjacent cannister.

Figure 2A:
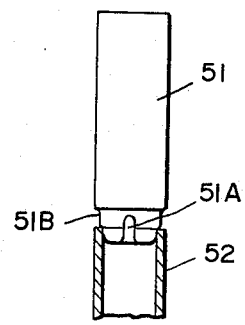
Figure 2B:
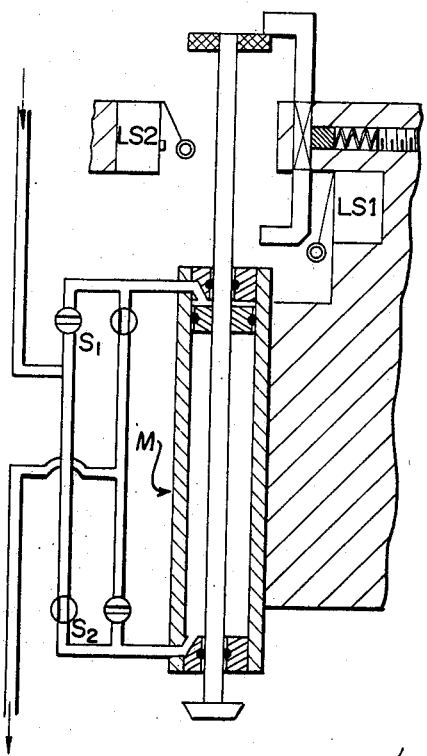

FIG. 2A shows the passages 51A in cross-section and FIG. 2B diagrams two adjacent cannisters 51, 52 nested together to form part of a train of cannisters the trough passages 51A at the base of the cannister 51 forming the pumping passages for cannister 52.

PUMPING SYSTEMS AND SENSOR (FIG. 1)

The pumping systems 41, 42, 43, 45, 46 are single mechanical pumps. The pumping system 44 comprises a cold trap 441, a diffusion pump 442 and a backing mechanical pump 443. A valve 444 is provided for air releasing the system or bleeding in desired quantities of gas for processing purposes in compartment 24. An orifice plate 445 is provided at the diffusion pump inlet to selectively cut back the full speed available from the pumping system 44. When the plate is in the position shown in full line with sectioning, the pumping speed is reduced. When the plate is in the dashed line position the pumping speed is increased.

A mass spectrometer leak detector or like gas analysis sensor, L/D is connected to compartment 24 and pumped out by the same pumping system 44. When the pumping speed is increased, the sensitivity of gas analysis will be reduced since gas evolving from the container (54) in compartment 24 will be pumped away to a greater extent before reaching the sensor. When the pumping speed is decreased, sensitivity of gas analysis (i.e. leak detection) is increased.

The actual leak detection test is conducted at reduced pumping speed and clean-up of the compartment 24 after leak detection measurement is conducted at increased pumping speed.

The output signal of sensor L/D is used to rate the leak tightness of the parts being tested and also to provide signals for automatically controlling the operation of the entire apparatus.

OPERATION OF FIG. 1

Cannisters are loaded with parts to be leak tested and fed to the top of the train of cannisters. In each cycle the plunger of the servomotor M moves the train of cannisters forward by a full cannister length and then draws back. Each time the plunger of the servomotor draws back, a new cannister is fed in and meanwhile the leak test is conducted via compartment 24. Even after loading, the servomotor waits a preset time for completion of the test. However, if the leak in the part being tested is significant (sufficient to reject the part), the control system, described below in connection with FIG. 3, will add an out-of-cycle additional motion by causing the servomotor to advance half a cannister length. This clears the cannister with the defective part from the compartment (24) associated wtih the sensor so that a continuing gas overload will not be imposed on the pumping system connected with that compartment. The remainder of the cycle is available for the pumping system 44 operating at full speed to clean up compartment 24. If this time is insufficient for clearing compartment 24, then the automatic control delays initiation of the next cycle until the signal level at the sensor (corresponding to residual partial pressure of trace gas) is sufficiently low for clean operation of the next cycle.

At this point, the steps of a test cycle may be outlined as follows:

(1) Plunger of servomotor M reaching bottom of its stroke pushes cannister train down by a full cannister length.

(1A) All pumping systems are operating continuously.

(1B) The orifice plate 445 is in the full line position.

(1C) The cannisters and their pumping passages (51A, 52A, etc.) reach essentially the positions shown in FIG. 1.

(2) The plunger draws back and a new cannister is loaded under the plunger.

(3) The plunger waits a preset cycle time (set as low as ¼ second or to as high as 4–5 seconds) before plunging forward again.

(3A) Meanwhile cannister 51 is being evacuated by pump 41 via passage 56A; 52 by 42 via 51A, etc.

(3B) Meanwhile the gas load introduced into compartment 22 by relief 51B passing over gasket 12 is being removed by pump 42; the gas load introduced into compartment 23 by relief 52B passing over gasket 13 is being dissipated, etc.

(3C) Meanwhile the gas analysis sensor L/D is operating to detect the level of trace gas coming from container 54 via passages 53A and compartment 24.

(4) (Normal pass cycle): During the leak test portion of the cycle, no significant leakage is detected. Then at the end of the cycle time the plunger advances down to start a new cycle per (1) above.

(4′) (Significant leak reject cycle): During the leak test portion of the cycle, a significant leak is detected. Prior to leak test completion, the control causes the plunger to advance the cannisters by half a cannister length. As applied to FIG. 1 this would clear cannister 54 and associated passages 53A from compartment 24 without introducing passages 52A to compartment 24. At the same time orifice plate 445 is raised to the dashed line position. At the end of the cycle the downward motion of the train of cannisters (remainder of a full cannister length) is completed to start a new cycle per (1) above.

(4″) (Gross leak reject cycle): Same as (4′) except that initiation of a new cycle is delayed until the sensor L/D indicates a complete clearance of the gas overload from the just completed cycle.

(5) One or more cycles later the cannister containing the tested part emerges from the tunnel for unloading and sorting with passed or rejected parts.

FIG. 3

Figure 3:
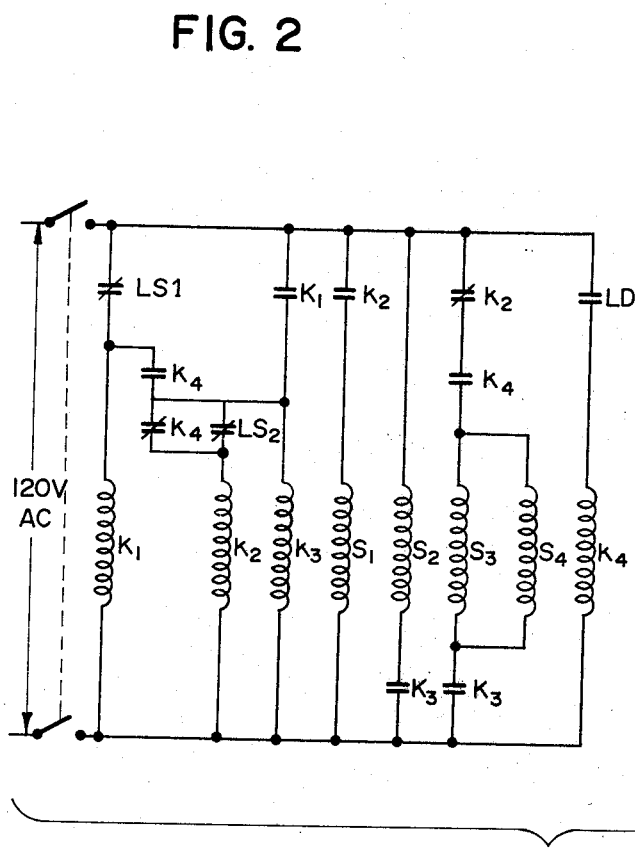
FIG. 3 is a circuit diagram of the electrical control of FIG. 1.

Referring now to FIG. 3, the control of the apparatus is shown in greater detail. The servomotor M is shown in its retracted position with the servo control valves arranged in their de-energized positions. The servomotor is constructed so that when valve S1 is subsequently energized to admit air pressure to the upper side, the piston will go down to advance the train of containers.

The electric circuit is shown in the arrangement corresponding to the retracted piston.

One main power is supplied to the circuit, current will flow through the relay coil K1 via the closed switch contacts LS1. Relay coil K1 is a time delay relay which will close after a predetermined interval (e.g. ¾ second) to provide a cycle period for pumping and leak testing to take place in the various compartments. Relay coil K1 will close switch contacts K1 (shown as open in the drawing). This will in turn admit current to relay coil K3 and to relay coil K2 via closed switch contacts LS2 and coils K2 and K3 will close contacts K2 and K3 to admit current to coils S1 and S2 to energize servo valves S1 and S2 to admit air pressure to the top side of the piston and exhaust the bottom side forcing it down to move the train of cannisters forward.

As the piston moves down, the pumping passages associated with the container carrying the next part to be leak tested reach the leak test compartment and place the interior of the container in communication with the part to be leak tested. The piston moves further to the bottom of its stroke where it trips switch LS1 to open contacts LS1 in the circuit. This inactivates coil K1 causing contacts K1 to open and in turn inactivates coil K3 causing contacts K3 to open which in turn inactivates S3 and S4. S3 operates a reject mechanism, with a memory function, so that if S3 is activated during a cycle, it will reject the container of that cycle when it later emerges from the apparatus. S4 operates the orifice valve of FIG. 1. With S4 inactivated, the orifice valve can close to allow a high sensitivity pumping test with the pumping speed at the leak detector throttled back. The opening of contacts K3 also de-energizes coil S2. With coils S1 and S2 again de-energized the servo valves S1, S2 have the position shown in the drawing and the piston goes up (contacts LS1 remaining open as the piston goes up). The piston goes up to the top of its stroke and then contacts LS1 reclose to reactivate the time-delay relay K1. The leak test cycle is carried out during the time delay built in the relay.

During this cycle time, the mass spectrometer may signal a leaking part. If this occurs the contacts LD of the circuit will close. This activates relay coil K4 to open normally closed contacts K4 and close normally open contacts K4 which has the net effect of providing an alternate and premature activation of coil K2 (via normally closed contacts LS2) without waiting for the time delay of coil K1. Activating coil K2 energizes S1 and the piston moves prematurely. However, this alternate activation of the motor is limited to half a stroke because the piston opens contacts LS2 in midstroke (corresponding to a position of the train with no pumping passages exposed to the leak detector compartment). Thus the remainder of the cycle time built into K1 is used for clean-up of the gas load. Even after contact K1 closes, the piston cannot continue its downward stroke until contact LD is re-opened by a clearing of the gas overload by the main pumping system. Reopening of LD inactivates coil K4 restoring the contacts K4 to their FIG. 3 positions to activate coil K2 (via K1, K4) thus energizing S1 and S2 to move the piston down.

FIG. 4

Figure 4:
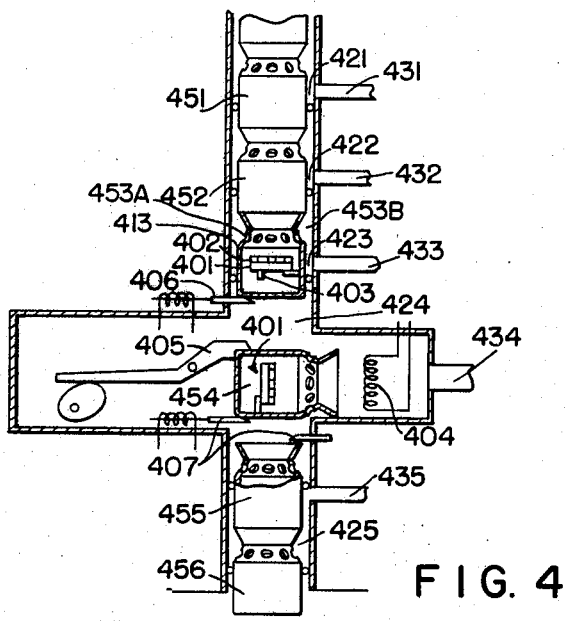
FIG. 4 is a schematic diagram of a vacuum coating apparatus utilizing a second embodiment of vacuum pumping station.

Referring now to FIG. 4, there is shown another embodiment of the vacuum pumping station of the invention utilized as a vacuum coater. A substrate 401 covered with a mask 402 and held on supporting arms 403 is mounted in each of the cannisters 451, 452, 453, 454, 455, 456, etc. The train of cannisters passes through a series of compartments, 421, 422, 423, 424, 425, in the tunnel passage. Pumping ports 431, 432, 433, 434, 435 connect the compartments to vacuum pumps (not shown).

In the FIG. 4 embodiment, each cannister has its own pumping passages in the wall thereof (e.g. 453A). As in other embodiments, the cannister wall is inwardly relieved in the axial zone of the passage (e.g. 453B). The axial length of the relieved pumping passage zone is small and staggered as in the other embodiments to prevent three successive compartments from having gas flow coupling at any time in the course of movement of the train of cannisters through the tunnel passage.

In the compartment 424, the cannister is turned by a work holder 405 to have the substrate 401 face a coating filament 404 which is flashed to coat the substrate. A solenoid operated detent 406 holds the following cannisters from coming forward under the influence of gravity and/or air pressure differential during the coacting operation. Similar detents 407 stop the working cannister 454 and already processed cannisters 455, 456.

This embodiment, like the FIG. 1 embodiment, can be provided with pressure sensing means to reject any cannister from working compartment 424 prior to completion of a full cycle incase of a high gas load (e.g. due to an excessively outgassing substrate). This FIG. 4 embodiment can be provided with automatic control means to prevent cross-over to a next cycle until gas pressure in compartment 424 is reduced to an appropriate level.

A design alternative to the turning work holder 405 of FIG. 4 is to let the cannister (e.g. 454) drop straight down without turning and insert the coating filament 404 above the open mouth of the cannister, withdrawing the filament between cycles to let the next cannister (e.g. 453) move into the place for coating.

FIG. 5

Figure 5:
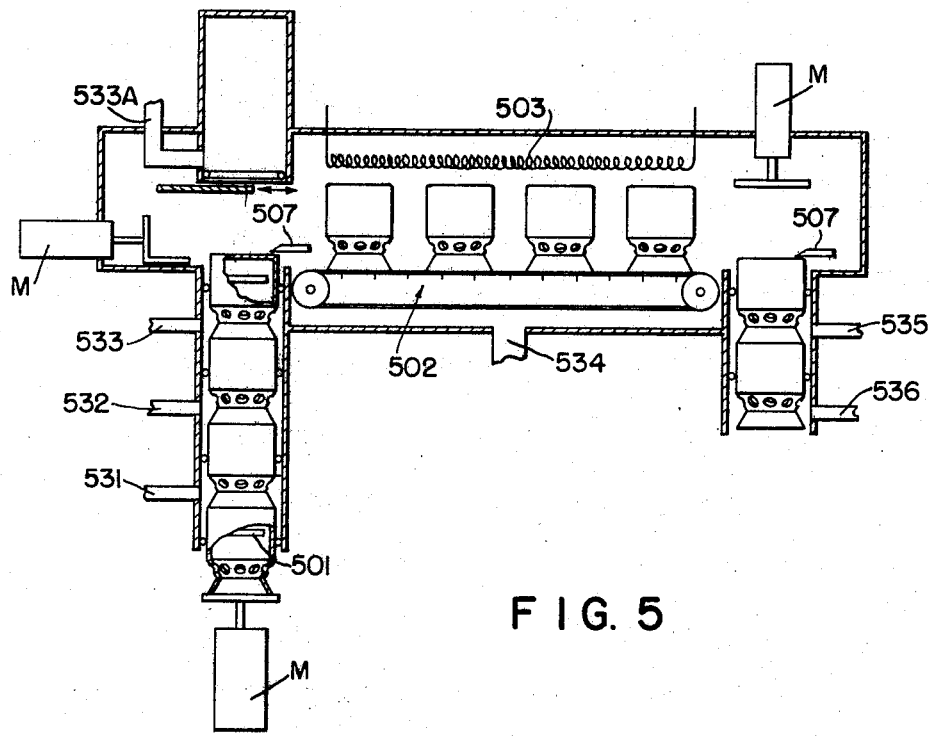

Referring now to FIG. 5, there is shown another embodiment of the vacuum pumping station of the invention utilized as a vacuum furnace. Parts 501 to be heated are held in cannisters by work holders (not shown). Tunnel entrance and exit passages are provided as in the other embodiments. The passages are divided by gaskets into several compartments with pumping ports 531, 532, 533, 534, 535, 536. In the main compartment is a conveyor 502 and a resistance or induction heating element 503. The cannisters are moved by servomotor M. Stops 507 are provided to counteract air pressure.

Cannisters which impose an excessive gas load on the system can be shunted to a separated compartment pumped out via port 533A.

FIG. 6

Figure 6:
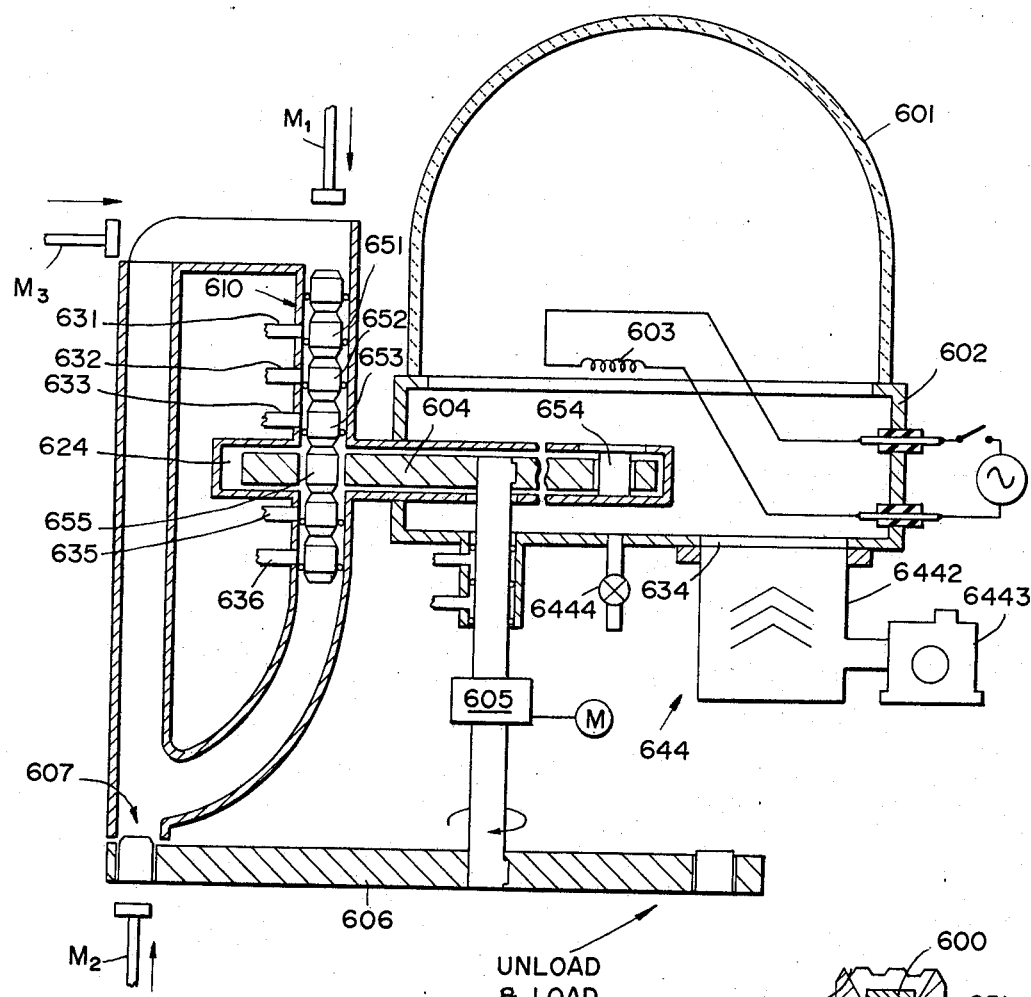

In FIG. 6 is shown the adoption of the pumping station of the invention to a bell-jar coating apparatus.

A bell jar 601 rests on a Dutch collar 602 and together therewith forms a vacuum chamber which is connected to the main pumping system. A coating source 603 within the chamber evaporates coating material which condenses on parts to be coated which are presented to the chamber one at a time by a rotary turntable 604 driven vith a Geneva drive to provide a cyclic motion with dwell periods.

A feeding tunnel 610 is divided by gaskets into an axial series of compartments, evacuated by mechanical pumps (not shown) via pumping ports 631, 632, 633, 635, 636. An intermediate compartment 624 is connected to the amin vacuum chamber which is evacuated by pumping system 644 starting at port 634 and comprising diffusion pump 6442 and backing mechanical pump 6443 and air release valve 6444.

Figure 6A:
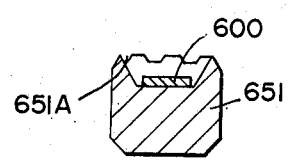

Cannisters 651, 652, 653, 654, 655 and the other cannisters shown in the drawing each carry a part to be coated (e.g. part 600 shown in cannister 651 in FIG. 6A). The typical cannister construction involved here is a hollow top block with a crown head. The spaces 651A in the crown head, in cooperation with the next adjacent cannister, form the pumping ports.

Starting from the arrangement shown in the drawing, the line of cannisters will advance so that cannister 653 containing an uncoated part displaces cannister 655, containing a coated part, from the turntable. Then the turntable rotates bringing cannister 653 under the coating source 603. Cannister 654 is returned to the line of cannisters.

Cannisters emerging from the bottom are unloaded and loaded with new parts with transportation via turntable 606. Once reloaded and returned to the location 607, the cannisters are moved to the top of the line of cannisters by servomotors M2, M3. Servomotor M1 provides the basic advance motion for the line of cannisters.

FIG. 7

FIG. 7 shows another embodiment of the invention for moving articles into and out of a bell-jar type vacuum chamber. Containers carrying parts to be treated in the vacuum chamber are fed through a long tunnel in series as a train. At the end of the cycle in progress in the drawing the train will advance so that container 753 will engage the end of container 754 with tongue 7531 on container 753 and the parts thereon being thus contained inside container 754. Container 754 can be rotated so that it can engage 7531. Then, pulling on container 754 withdraws container 753 to the position shown for 754 in the drawing, leaving the parts on 7521 exposed. The tunnel and bell-jar are subdivided into an axial series of compartments evacuated by pumping ports 732, 733, 734, 735, 736. The bell-jar and the stages before and after the bell-jar are evacuated by diffusion pumped systems.

Thus, I have provided a new concept of leak detector combination and a new concept in the component vacuum pumping station subcombination. Within the scope of the present invention, several alternatives can be made in addition to those described herein. It is therefore intended that the above disclosure shall be read as illustrative and not in a limiting sense.

What is claimed is:
1. A leak detector apparatus comprising
  (a) means forming an elongated passage;
  (b) at least one elongated hollow container for traversing through the passage carrying a part to be leak tested which contains trace gas therein;
  (c) gasket means distributed along the length of the passage to divide the passage into a series of compartments;
    (a') the above said means (a)–(c) being constructed and arranged so that the container compresses the gasket means to seal one compartment from the next;
  (d) means for moving the container through the passage;
  (e) vacuum pumping means for controlling pressure in each of the compartments;
  (f) means forming a pumping passage in the container (b) so that said means (e) controlling pressure of each compartment also controls the pressure within the container therein; and
  (g) gas analysis means connected to one of said compartments to monitor gas evolving from said test part, as a function of leak tightness of the test part, when the container carrying said test part is connected to the compartment via the means (f);
    (b') the said means (a)–(g) being constructed and arranged so that the compartment to which the gas analysis means (g) is connected is maintained at a first pressure level compatible with operation of siad gas analysis means.

2. The apparatus of claim 1 comprising a series of said containers (b) arranged end to end to form a train passing through said passage (a).

3. The apparatus of claim 1 wherein the means (f) are constructed and arranged to occupy a limited portion of the axial length of the container.

4. The apparatus of claim 1 wherein said means (d) is constructed and arranged to move the container (b) to traverse the passage (a) in regular cyclic fashion from compartment to successive compartment.

5. The apparatus of claim 4 further comprising (h) means for adding an out-of-cycle additional motion to selectively clear a container from the compartment connected to the gas analysis means without waiting for completion of a cycle and (i) means for delaying initiation of a new cycle, the said means (h) and (i) being connected to the gas analysis sensor to be activated in response to significant leakage levels detected by said sensor.

6. The apparatus of claim 5 comprising a series of said containers (b) arranged end to end to form a train passing through said passage (a).

7. The apparatus of claim 6 wherein the means (a)–(f) are constructed and arranged to produce and maintain a pressure in the container less than about ten microns when the container reaches a central compartment coupled to the gas analysis means and wherein the gas analysis means comprises a mass spectrometer.

8. The apparatus of claim 7 wherein said gas analysis means comprises means for signalling an overload of gas, such as produced by a signilcant leak in a part to be tested, and for automatically actuating said means (h) to clear the container currently in the compartment coupled to the gas analysis means prior to completion of a full cycle of residence in said compartment.

9. The apparatus of claim 8 wherein a portion of said pumping means coupled to the same compartment as the gas analysis means comprises means providing excess pumping capacity compared to normal gas loads of the containers and test parts and means responsive to said gas analysis means for limiting said excess capacity in mid-cycle whereby the combination of excess capacity and mid-cycle removal of high gas load containers allows regular fast cycle operation of the leak detector and whereby the mid-cycle limiting of excess capacity allows conduct of the gas analysis step at maximum sensitivity.

10. A leak detector apparatus comprising means forming a leak detection compartment; high vacuum gas analysis means coupled to said compartment; high vacuum pumping means coupled to said compartment; container means for introducing test parts containing trace gas capable of evolving through leaks in the test parts into and removing test parts from said compartment in regular cyclic fashion with the container means holding the test part and having passage means therein for providing fluid communication between the interior of the container means and said compartment; and control means responsive to the size of signal detected by said gas analysis means, corresponding to leaking trace gas evolved from a test part in said container means, for automatically decreasing the pumping capacity of said pumping means in mid-cycle in the absence of a significant leak and for automatically cutting off the fluid communication through said passage means in mid-cycle in the presence of a significant leak.

11. Vacuum pumping station comprising:
(a) means forming an elongated passage;
(b) at least one elongated container for traversing through the passage carrying a part to be exposed to vacuum;
(c) gasket means distributed along the length of the passage to divide the passage into a series of compartments;
   (a') the above said means (a)–(c) being constructed and arranged so that the container compresses the gasket means to seal one compartment from the next;
(d) means for moving the container through the passage;
(e) vacuum pumping means for controlling pressure in each of said compartments;
(f) means forming a pumping passage in the container (b) and occupying ¼ or less of container length so that said means (e) controlling pressure of each compartment also controls the pressure within the container to substantially the same extent;
   (b') the said means (a)–(f) being constructed and arranged to provide at least an evacuation of the container from atmospheric pressure to vacuum as it moves over a series of successive compartments.

12. The apparatus of claim 11 comprising a series of said containers (b) arranged end to end to form a train passing through said passage (a).

13. The apparatus of claim 12 wherein the said means (d) is constructed and arranged to move the containers (b) to traverse the passage (a) in a regular cyclic fashion from compartment to successive compartment.

14. The apparatus of claim 13 further comprising (h) means for adding an out-of-cycle additional motion to selectively clear containers from one of the compartments without waiting for completion of a cycle.

15. The apparatus of claim 13 wherein said means (d) is constructed and arranged to delay initiation of a new cycle until any gas loads generated in the previous cycle are eliminated.

16. The apparatus of claim 11 wherein said passage comprises a circular section tunnel and said gaskets are circular.

17. The apparatus of claim 16 comprising a series of said containers (b) arranged end to end to form a train passing through said passage (a), the containers having a cup form.

18. The apparatus of claim 17 wherein the pumping passage means (f) are constructed and arranged to occupy a limited portion of the axial length of the container with the container being relieved inwardly at the axial site of the pumping passages to clear the gaskets.

19. The apparatus of claim 18 wherein the gaskets, containers and pumping passages therein are constructed and arranged so that the relieved container portions of successive containers clear successive gaskets at staggered time intervals.

20. A leak detector apparatus comprising:
(a) means forming an elongated cylinder tunnel passage;
(b) a train of equal length cup-like containers arranged end-to-end to form a train for passing through the passage while carrying parts to be leak tested which contain trace gas therein;
(c) O-ring gaskets distributed along the length of the passage to divide the passage area around the containers into compartments;
   (a') the above said means (a)–(c) being constructed and arranged so that the containers compress the gasket means to seal one compartment from the next with the exception that the containers comprise relieved portions located at their end to end connections to relax the compression seal as the relieved section passes each gasket the temporary lengths between gaskets being selected so that no two adjacent gaskets are simultaneously relaxed;
(d) means for moving the train of containers through the passage in regular cyclic fashion;
(e) vacuum pumping means for controlling pressure in each of the compartments;
(f) pumping passage means formed at the end to end connections of the containers in the relieved portions thereof for placing the interiors of said containers in communication with the respective compartments as the containers pass through each compartment;
(g) gas analysis means connected to a central one of said compartments to monitor gas evolving from said containers, via said passage means as a function of leak tightness of the test part within said container;
(h) means for adding an out of cycle additional motion to selectively clear the container then residing in said central compartment connected to the gas analysis means out of said leak test compartment without introducing a new container into fluid communication with the compartment, in response to significant gas overloads sensed by said gas analysis means; and
(i) means for automatically acting between cycles in response to significant gas overloads sensed by said gas analysis means to delay initiation of the next regular cycle until said gas overload is dissipated by said pumping means.

References Cited

UNITED STATES PATENTS

| 2,761,973 | 9/1956 | Brennan | 117—119 XR |
| 2,930,347 | 3/1960 | Bulloff | 117—119 XR |
| 3,123,493 | 3/1964 | Brick | 117—119 XR |
| 3,126,734 | 3/1964 | Stutzman | 73—40.7 XR |
| 3,327,521 | 6/1967 | Briggs | 73—40.7 |

FOREIGN PATENTS

| 1,441,963 | 5/1966 | France. |
| 1,152,560 | 8/1963 | Germany. |

LOUIS R. PRINCE, Primary Examiner

JEFFREY NOLTON, Assistant Examiner

U.S. Cl. X.R.

117—119; 137—566